Aug. 25, 1970   R. S. HUNTER ET AL   3,525,572

ADJUSTABLE SCALE COLORIMETER

Filed June 15, 1966   2 Sheets-Sheet 1

INVENTORS
Richard S. Hunter
John S. Christie
Roland D. Robinson

BY Max L. Libman

ATTORNEY

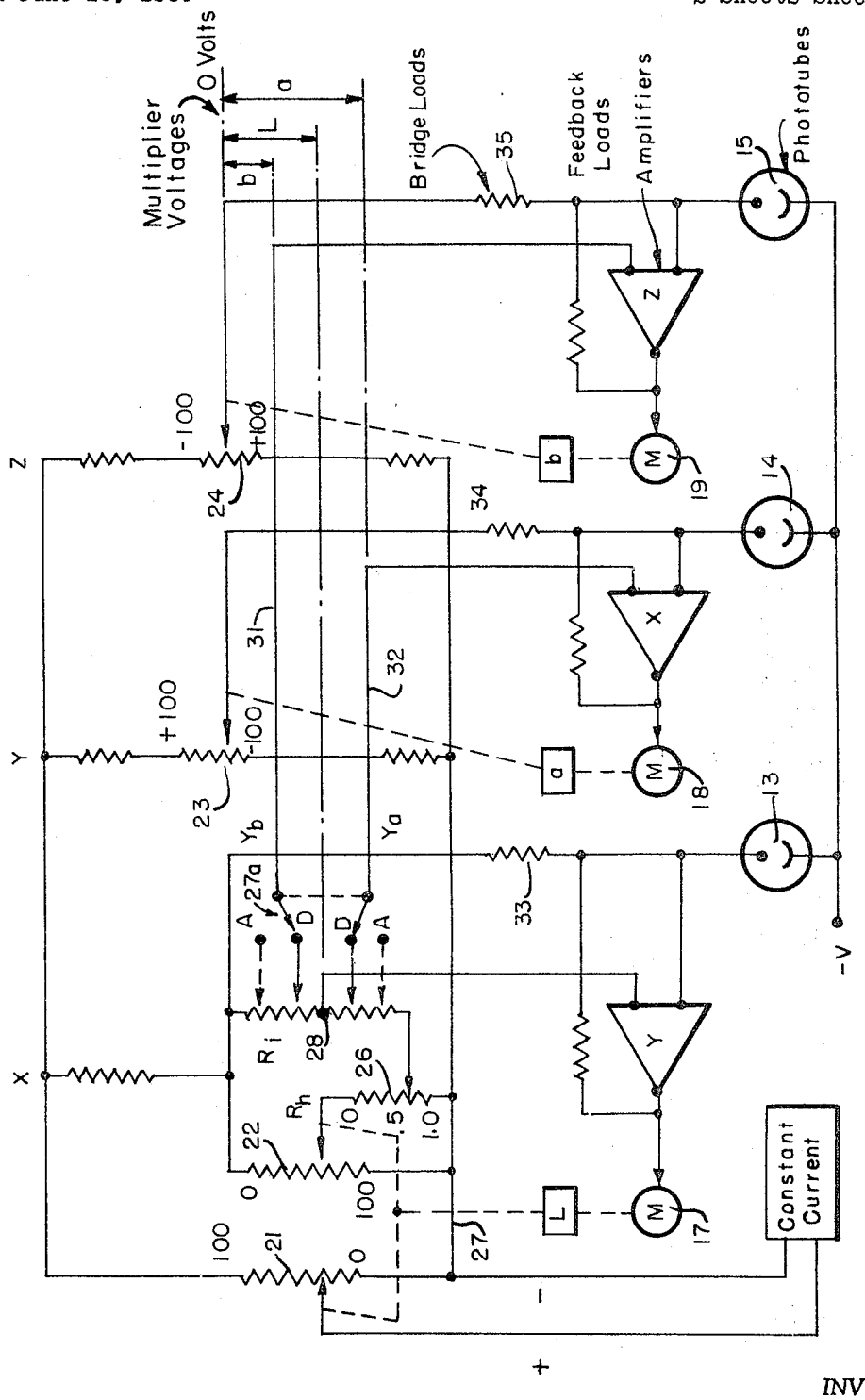

United States Patent Office 3,525,572
Patented Aug. 25, 1970

3,525,572
ADJUSTABLE SCALE COLORIMETER
Richard S. Hunter and John S. Christie, McLean, and Roland D. Robinson, Alexandria, Va., assignors to Hunter Associates Laboratory, Inc., Fairfax, Va., a corporation of Virginia
Filed June 15, 1966, Ser. No. 557,684
Int. Cl. G01j 3/48, 3/50; G01n 21/00
U.S. Cl. 356—176
5 Claims

ABSTRACT OF THE DISCLOSURE

This invention relates to a psychophysical instrument for measuring color and color differences of surfaces by photoelectric measurement of light reflected from such surfaces without reliance on the color judgment of human observers. It has for its primary objects the provision of non-directional illumination means for rendering the instrument substantially insensitive to the direction of fabric weave of the specimen being examined, means for expanding the chromatic scale intervals for dark colors to correspond more closely to visual observation, and improved means permitting the use of different standard illuminants.

BACKGROUND OF THE INVENTION

A major use of the invention is for measuring the colors of fabrics. However, with light emanating from a conventional source, the measurement results are systemically affected by the directions of fabric weave. It is a major object of the present invention to provide means for illuminating the specimen with light from a source which is sufficiently bright and diffused to overcome this difficulty and which at the same time simulates the geometric conditions of observation used for the visual examination of the colors of these fabrics by manufacturers and purchasers. Furthermore, means must be provided for effectively changing from one type of standard source to another.

Experience with prior art instruments has indicated that they measure chromatic differences between the colors of dark fabrics to be much smaller than they appear to be to the human observer. The instrument of the present invention is of the same general type as that described in the U.S. patent to Hunter et al., No. 3,003,388. This type of instrument uses filters combined with photocells to provide tristimulus signals X, Y and Z, but these signals are combined within the instrument in a complex way in accordance with empirical formulas which have been established in this art as giving results corresponding to the visual impressions of the human observer. It is a further major object of the present invention to provide means for introducing the necessary dark-color scale expansion without otherwise affecting the operation of the instrument.

Color specifications are based on the use of standard illuminants, two of the most common illuminants being those corresponding to artificial daylight (illuminant D) and to ordinary incandescent light (illuminant A). It is a further object of the present invention to provide means enabling measurements of color for either of these illuminants, retaining for both the same color-scale relationship with visually observed color. This involves keeping neutral white and gray at the center of the chromatic diagram where $a=0$ and $b=0$, as will be explained in more detail below.

DESCRIPTION OF THE INVENTION

The specific nature of the invention, as well as other objects and advantages thereof, will clearly appear from a description of a preferred embodiment as shown in the accompanying drawings, in which:

FIG. 4 is a highly simplified schematic circuit diagram of an apparatus according to the invention.

Figure 1:
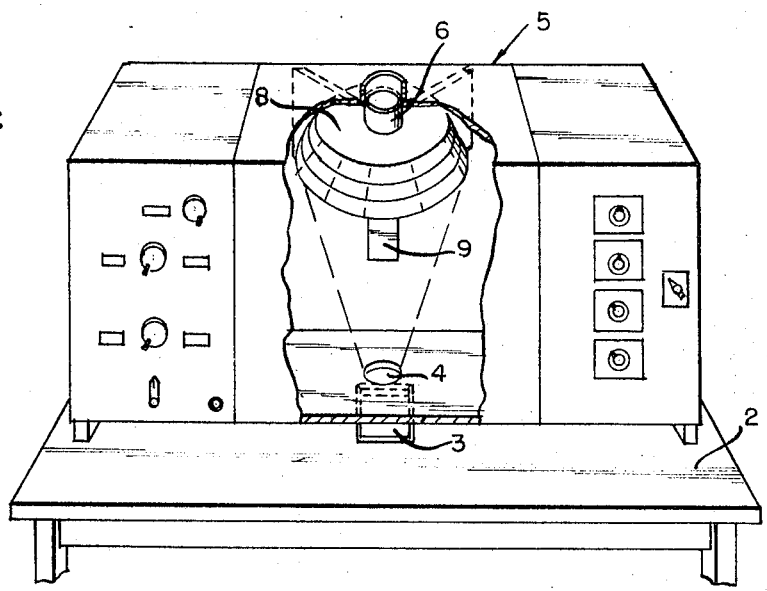
FIG. 1 is a perspective view of an apparatus embodying the invention, with the front panel partly broken away to better show the light sources.
Figure 2:
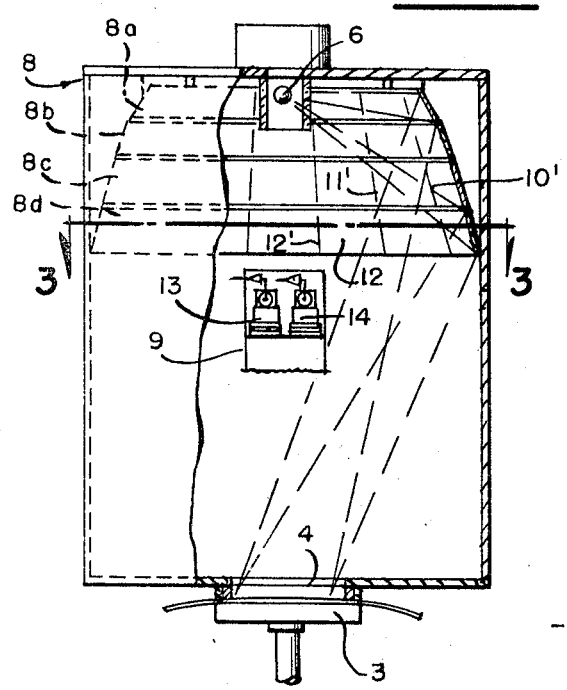
FIG. 2 is an enlarged view, partly broken away, of the light source assembly.
Figure 3:
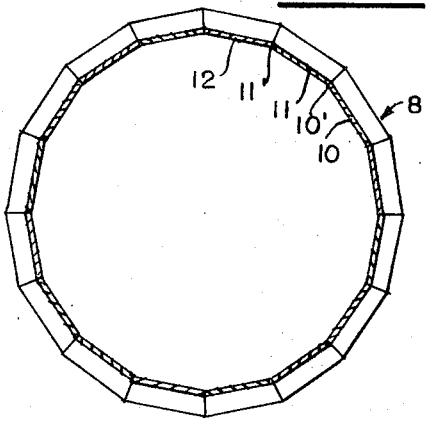
FIG. 3 is a sectional view taken on line 3—3 of FIG. 2 through the reflector unit.

Referring to FIG. 1, the apparatus is preferably mounted upon a table 2 provided with a movable platform 3 which may be elevated by foot pressure of a pedal (not shown) so as to press a specimen, e.g., a piece of fabric being tested, up against an aperture 4 where it is illuminated by light projected from a concentrated-element source 6 by means of a reflector 8 of sufficently large size to provide directions of incidence angles varying from 10° to 25°. Light reflected from the specimen falls upon a number of photosensitive units housed within a receptor 9 placed directly above the specimen at a suitable distance and so located that it blocks direct transmission of light from the point source 6, but does not interfere substantially with reflected light from the ellipsoidal reflector 8. Typical dimensions for a practical apparatus are 4" diameter for the specimen 4, 14" maximum diameter by 5" high for the reflector unit, with the source 6 located at one focus of the ellipsoid and the specimen located in a plane though the other focus. As shown in FIG. 2, the preferred construction for the reflector is achieved by forming it of segmented metal rings $8a \ldots 8d$, the interior surface of which is highly polished. Each ring is formed of a number of flat segments such as 10, 11 and 12 for ring $8d$, each segment being in effect a flat mirror positioned at the proper angle to reflect light from source 6 onto the exposed area of specimen surface. The size of the illuminated spot at 4 is determined by the size of the flat segments within the ellipse. It will be apparent that each ring, or a sector of each ring, can be cut from a flat sheet of metal which is then bent at the proper angle along the crease lines 10', 11', 12', etc. to conform to the desired final shape. The segmented rings $8a \ldots 8d$ again can be assembled by any suitable means (not shown) to form the complete elliptical reflector. The illumination level is very high due to the fact that a large part of the light from a single lamp is directed to the specimen. Since the light does not come from a single angle, but in effect from a range of angles, the illumination has very low sensitivity to fabric orientation, which is the desired result. The spot size can be changed by providing separate assemblies with different numbers of rings and facets each; if a very small diameter spot is required, this can be achieved by using a non-faceted elliptical reflector which projects an enlarged image of the lamp filament, i.e., by using a truly elliptical reflecting surface.

A suitable light source 6 is provided by a 45-watt quartz iodine-cycle lamp, which has superior light and color constancy. The receptor assembly 9 is installed below the lamp and along the perpendicular axis, and in a practical device, is provided with end-illuminated phototubes 14 which have a diameter of less than an inch so that four of these, each provided with a circular tristimulus filter may be mounted on a 2.5" diameter cylindrical block which is held at constant temperature. (Four photocells are needed because two are used for X, which requires two separate filters.) For spreading light uniformly to these four photocells, a simple light-pipe and diffuser unit (not shown) may be used. The triangles shown above the photocells represent amplifiers mounted in the receptor to minimize pick-up in the high-impedance part of the circuit. The entire assembly is suitably mounted within a light-tight cabinet 5 supported a convenient distance above table 2.

In the conventional psychological color solid representing the colors of surfaces, the vertical axis represents the lightness, which varies from black to white through the various degrees of grayness; the hue is represented by the direction from the axis, the various directions corresponding to red, yellow, green, blue, purple, or intermediate colors; and the saturation is represented by the length of the radius extending from the gray or lightness axis to the periphery representing the strongest colors.

Figure 5:
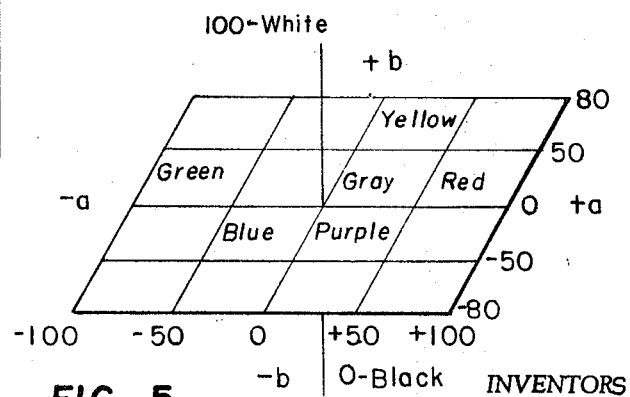
FIG. 5 represents a rectangular color solid.

FIG. 5 shows another commonly used arrangement for depicting colors in terms of three values, generally corresponding to those of the conventional color solid, but conforming to a three-dimensional Cartesian coordinate system. An arbitrary scale of values is assigned to each coordinate as shown. The present instrument uses essentially the scales of FIG. 5.

The instrument provides, in effect, computing circuits which will translate the photocells' responses to received light, after passing through suitable color filters, into readings which correspond to units of the color scale.

The measuring circuitry employed in the present instrument is generally similar to that shown in Pat. No. 3,003,388 previously referred to. However, experience has indicated that this instrument does not provide adequate chromatic intervals for dark colors, since in this range of colors, the results obtained by the instrument do not correspond with those obtained by the human observer. This apparently results from the use of the square root of Y as a multiplier for both the lightness scale and the chromatic scales; essentially this has been widely used because by using it the computation of color differences is relatively simple. However, recent experience indicates that the multipliers for lightness and chromatic scales should be different. The square root of Y is suitable for the lightness scale. A more nearly correct factor for the uniform chromatic scales is $Y^{1/4}$ if we speak of the factor with which the phototube tristimulus-difference signals $(X_\% - Y_\%)$ and $Y_\% - U_\%)$ must be multiplied.

It will be apparent that the relationship is not a simple one, and applicant has discovered that the use of a potentiometer (arbitrarily termed an $R_h$ potentiometer) cascaded with the lightness (L) potentiometer would provide modifications of the lightness-to-chromatic intervals of the type desired.

It was also desired to adapt the present colorimeter spectrally for measurements of colors and color differences using either one of two standard illuminants, identified respectively as illuminant A, corresponding to ordinary artificial electric lamp illumination, and illuminant D, which is a widely used artificial daylight source. These are standard illuminants well known in the art.

The actual illuminant used in the instrument is an incandescent lamp operating at a voltage which is controlled to operate at close to 3000° K. A bluish heat-absorbing filter in the form of a chimney surrounds the lamp. The tristimulus filters over the phototubes are designed, as in the case of the instrument described in Pat. No. 3,003,388, to convert the spectral response of the light source heat filter combination to the C.I.E. observer under illuminant D. Separate phototubes are used for the amber and blue portions of the X function. An iris is used over the blue X phototube to adjust the two parts of the X signal for the proper relative magnitude.

An amber filter may be inserted in the light pipe to convert the spectral response of the system from X, Y, and Z under illuminant D to X, Y, and Z under illuminant A. However, the use of two different illuminants requires certain basic circuit modifications if the instrument is to retain its advantages of uniform color scales and interpretability of results. In making these circuit modifications, it is desirable not to change the L scale as a function of Y (although, actually Y values of colored specimens will change with illuminant). It is also desirable to assume color constancy of whites and grays and keep them at 0, 0 on the $a$, $b$ diagram, this being the well-known color solid diagram shown in FIG. 1 of Pat. No. 3,003,388. It is also desired that, as the illuminants change, the Y contribution to the $a$ function will change with $X/Y$ of $M_gO$, and the Y contribution to the $b$ function will change with $Z/Y$ of $M_gO$. On the basis of the foregoing objectives, and the assumptions resulting therefrom, and from the equations of $a$, $b$ for illuminant C, it is possible to write equations for $a$ and $b$ for any illuminant.

The well-known $a$ and $b$ equations for illuminant C are:

$$a = 175Y^{-1/2}(1.02X - Y)$$
$$b = 70Y^{-1/2}(Y - 0.847Z)$$

Tristimulus value Y is always reflectance relative to that of $M_gO$. Thus, for any illuminant, Q:

$$L = 100Y^{1/2}$$

(or if Y is in percent, $L = 10Y^{1/2}$).

If we call $j_x$ and $j_z$ the factors which convert $M_gO$ tristimulus values X and Z for any illuminant Q to tristimulus values for illuminant C:

$$j_x = {^X}(M_gO)C/{^X}(M_gO)Q$$
$$j_z = {^Z}(M_gO)C/{^Z}(M_gO)Q$$

then $$a = 175 j_x Y_Q^{-1/2}\left(\frac{1.02X_Q}{j_x} - Y_Q\right)$$
$$b = 70 j_z Y_Q^{-1/2}\left(Y_Q - \frac{0.847Z_Q}{j_z}\right)$$

(Where X, Y, Z are given in percent, divide each equation by 10.)

Values of J for illuminants D and A can be computed from X and Z for $M_gO$ (10).

|  | $X_{M_gO}$ | $j_x$ | $Z_{M_gO}$ | $j_z$ |
| --- | --- | --- | --- | --- |
| Illuminant C | .980 | 1.00 | 1.181 | 1.000 |
| Illuminant D | .961 | .980 | 1.244 | 1.053 |
| Illuminant A | 1.098 | 1.120 | .355 | .301 |

Equations for $a$ and $b$ for C.I.E. illuminants A and D are accordingly:

Illuminant A equation $$L = 100Y_A^{1/2}$$
$$a = 196Y_A^{-1/2}(.911X_A - Y_A)$$
$$b = 21Y^{-1/2}(Y - 2.82Z_A)$$

Illuminant D equation $$L = 100Y_D^{1/2}$$
$$a = 171.5Y_D^{-1/2}(1.041X_D - Y_D)$$
$$b = 73.7Y_D^{-1/2}(Y_D - .804Z_D)$$

We thus have general equations for $a$ and $b$ suitable for use with any illuminant.

Referring to FIG. 4, which is a highly simplified schematic circuit diagram, the light is assumed to be reflected from the specimen, as shown in FIG. 2, to the photocells 13, 14 and 15, corresponding to the photocells 3, 4 and 5 of Pat. No. 3,003,388. In this case, instead of a single meter which is switched to the output of each of the photocells, the photocells are respectively shown provided with amplifiers Y, X, and Z, to identify their outputs, and a separate servo motor-indicating counter unit 17, 18, and 19 respectively shown for each photocell, the counter readings corresponding respectively to the L, $a$, and $b$ values which represent the output of the device. In general, the circuit is similar to that shown in Pat. No. 3,003,388, with potentiometers 21, 22, 23 and 24 corresponding respectively to potentiometers 19, 28, 42 and 52 of the patent. The $R_h$ potentiometer 26 is interposed, as will be seen, between line 27, which is at the 0-point of reference potentiometer 21, and the slider of potentiometer 22. The $R_i$ potentiometer 28, which provides the necessary adjustment for the two different illuminants previously referred to, is connected between the slider of potentiometer 26 and the 0 point of the L potentiometer 22. It is provided with illuminant A and D sliders which supply reference voltages to the $a$ and $b$ measuring circuits respectively. These are preset to the correct values at the factory. A selector switch 27a is used to make the proper connections for the illuminant which is employed. It will thus be seen that $R_h$ and $R_i$ potentiometers respectively modify the output on lines 31 and 32 and that these provide the $Y_b$ and $Y_a$ outputs respectively which are balanced against the outputs of potentiometers 23 and 24 as described in Pat. No. 3,003,388.

It will be understood that the actual circuitry may be similar to that of the patent, the circuit of FIG. 4 being highly simplified in order to show more clearly the relationship of the $R_h$ and $R_i$ potentiometers to the rest of the rest of the circuit.

The $R_h$ potentiometer or voltage divider 26 is of sufficiently high resistance so as not to appreciably load potentiometer 22. When set to zero, the scales are not altered. When set to 1.00, the L scale actually reads Y and the former value of $Y^{-\frac{1}{2}}$ in equations for $a$ and $b$ becomes $Y^{-1}$. The value $Y^{-1}$ gives extreme expansion of $a$ and $b$ for dark colors. The actual setting depends upon the amount of expansion desired, a preferred value for $R_h$ being about 0.50, which gives a multiplier of approximately $Y^{-\frac{3}{4}}$.

In changing scales by the $R_i$ setting, the arrangement is such that the standard white stays at the center of the $a$, $b$ color solid diagram, where chromaticity equals zero, corresponding to the basic assumption made in the preceding discussion. When the illuminant is changed toward either more yellow or more blue, the Z and X values change and follow the illuminant; then, in order to keep the X, Y, and Z signals in balance ($a$ and $b=0$, for a neutral color) the fraction of the Y signal (selected by switch 27) is changed and is balanced against the X signal to accommodate the illuminant change. In practice, the illuminant is changed by inserting a suitable filter, and then setting switch 27 to the appropriate contact, corresponding to the illuminant. This produces a voltage on lines 31 and 32 proportional to the Y signal, which is then balanced against the output of photocells 14 and 15 across their respective load resistors 34 and 35 as described in the Pat. No. 3,003,388.

The $R_i$ potentiometer can be used to perform a dual function. In a practical unit, the $R_i$ potentiometer has a conventional fine adjustment which the operator can also use as a means of calibrating his instrument. For example, if in a given case he has a white standard (working on illuminant D), he must set the $a$ and $b$ dials to the proper values known for the standard, and he will then as his final operation turn the upper $R_i$ cascade to produce a zero meter indication on his $b$ scale, and will adjust the lower end to give a zero meter indication on the $a$ scale. Thereafter, these settings remain unchanged, and the instrument is operated in the usual fashion for color measurement of specimens being tested.

It will be apparent that the embodiments shown are only exemplary and that various modifications can be made in construction and arrangement within the scope of our invention.

We claim:
1. Colorimetric apparatus comprising
  (a) a concentrated source of standard illumination,
  (b) annular focussed reflector means for reflecting light from said source onto a specific area of a specimen under examination, the reflecting surface of said reflector means being much larger than said area so that light from the surface impinges on the specimen over a sufficiently wide angular range to minimize any directional effect of weave of a fabric specimen being examined,
  (c) photocell means responsive to light from the specimen area for selecitvely producing three electrical outputs corresponding to the spectral response function of the human eye,
  (d) electric circuit means supplied by said photocell means for combining the electrical outputs of said photocells to produce electrical output values corresponding respectively to the lightness L, the red-greenness $a$, and the yellow-blueness $b$ of a specimen, said electrical circuit means comprising respectively adjustable potentiometers for adjusting the respective outputs to balance,
  (e) further adjustable potentiometer means in cascade with the lightness potentiometer means and adjustable to expand the chromatic output scale intervals for dark colors to a presettable degree relative to the scale reading for light colors,
  (f) additional potentiometer means in cascade with said further adjustable potentiometer means (e) and adjustable to compensate for at least two different standard illuminants so as to provide any white or gray neutral color readings ($a=0$; $b=0$) for either illuminant.

2. The invention according to claim 1, and a housing for said photoelectric means, said housing being in the direct path of light transmission from said light source to the specimen, whereby direct transmission of light from the source to the specimen is blocked.

3. The invention according to claim 2, said reflector means comprising a ring-shaped section of an ellipse divided into flat mirror segments, each segment reflecting light from the concentrated source to the selected area of the specimen under test.

4. Colorimetric apparatus comprising
  (a) a source of standard illumination,
  (b) means providing a test area of fixed size for a specimen being examined, said test area being illuminated by said source,
  (c) photocell means responsive to light from the specimen area for selectively producing three electrical outputs corresponding to the spectral response function of the human eye,
  (d) electric circuit means supplied by said photocell means for combining the electrical outputs of said photocells to produce electrical output values corresponding respectively to the lightness L, the red-greenness $a$, and the yellow-blueness $b$ of a specimen, said electrical circuit means comprising a plurality of adjustable potentiometer elements respectively associated with said photocells for adjusting the respective outputs to balance, the output of one of said potentiometers being adjustable to correspond to the value of lightness L of the specimen under observation,
  (e) further adjustable potentiometer means in cascade with the lightness potentiometer and adjustable to expand the chromatic output scale intervals for dark colors to a presettable degree much greater than the corresponding scale intervals for light colors.

5. The invention according to claim 4, and additional potentiometer means in cascade with said further adjustable potentiometer means and adjustable to compensate for at least two different standard illuminants so as to provide the same specimen readings for either illuminant.

References Cited

UNITED STATES PATENTS

| | | |
|---|---|---|
| 2,228,559 | 1/1941 | Cox. |
| 3,003,388 | 10/1961 | Hunter et al. |
| 3,355,928 | 12/1967 | Rendina. |

(Other references on following page)

FOREIGN PATENTS 696,246   8/1953   Great Britain.

OTHER REFERENCES

"Application of Colour Measurement in Textile Practice," F. J. Rizzo, J. Soc. Dyers & Colourists, December 1965, pp. 592–598.

"Colorede ®," an abstract of new products introduced prior to December 1963, Am. Dyestuff Rprtr., 52, Dec. 9, 1963, p. 79.

Lewis, E. L. "Colorede: Color Measurement for Continuous Dyeing," Am. Dyestuff Rprtr., 53, July 20, 1964, pp. 30–35.

"Hunter Associates Lab. Inc." in Directory of Individual Exhibitors" at the 1964 convention, Am. Dyestuff Rprtr. 53, Aug. 31, 1964, pp. 126–7.

"Hunterlab D38 Natick Laboratories, Colorimeter," an abstract of new products introduced prior to December, 1964, Am. Dyestuff Rprtr., 53, Dec. 7, 1963 and Title page, pp. 1029–1055.

RONALD L. WIBERT, Primary Examiner

R. J. WEBSTER, Assistant Examiner

U.S. Cl. X.R.

209—111.6; 250—226